United States Patent
Katayanagi

(10) Patent No.: US 6,636,517 B1
(45) Date of Patent: Oct. 21, 2003

(54) ATM CELL ASSEMBLING/DISASSEMBLING APPARATUS

(75) Inventor: Satoshi Katayanagi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/500,221

(22) Filed: Feb. 8, 2000

(30) Foreign Application Priority Data

Feb. 10, 1999  (JP) .......................................... 11-032573

(51) Int. Cl.[7] .............................................. H04L 12/28

(52) U.S. Cl. ............................... 370/395.6; 370/395.6; 370/395.62; 370/473; 370/474

(58) Field of Search ....................... 370/395.6, 395.61, 370/395.62, 395.63, 395.64, 395.65, 473, 474

(56) References Cited

U.S. PATENT DOCUMENTS 5,802,287 A  *  9/1998  Rostoker et al. ......... 395/200.8

* cited by examiner

Primary Examiner—Douglas Olms
Assistant Examiner—Robert W. Wilson
(74) Attorney, Agent, or Firm—Foley & Lardner

(57) ABSTRACT

The present invention provides an ATM cell assembling/disassembling apparatus capable of reducing power consumption. A reception VC detector 16 decides whether a reception cell is valid. A reception controller 17 performs disassembling and error check of a cell which has been decided to be valid by the reception VC detector 16 before issuing a DMA transfer request. A DMA output block 12 reads out a reception payload data from a reception data buffer 18 and DMA-transfers the data to a host memory 3. A reception clock controller 20 starts clock supply to the reception controller 17 when the reception VC detector 16 has decided that the reception cell is valid, and terminates the clock supply to the reception controller 17 upon completion of processing for one cell in the reception controller 17.

6 Claims, 10 Drawing Sheets

ATM CELL ASSEMBLING/DISASSEMBLING APPARATUS

BACKGROUND OF THE INVENTION

1. Field of the Invention

The present invention relates to an ATM (asynchronous transfer mode) cell assembling/disassembling apparatus provided at an ATM terminal on an ATM network.

2. Description of the Related Art

In general, an ATM cell assembling/disassembling apparatus is provided on an ATM terminal connected to an ATM network. In this ATM cell assembling/disassembling apparatus, as a configuration for realizing a reception function, a 53-byte reception ATM cell sent from a physical layer device is disassembled into a 5-byte header data and 48-byte payload data. Furthermore, from a plurality of payloads, a reception packet is formed per virtual channel (hereinafter, referred to as VC) for use for passing to an upper layer application.

Moreover, for realizing a transmission function, a transmission packet formed by an upper layer application is divided into 48-byte payloads, and a 5-byte header is added to each of the payloads so as to be transmitted to a physical layer device.

FIG. 9 is a block diagram showing a conventional ATM cell assembling/disassembling apparatus. As shown in FIG. 9, an ATM cell assembling/disassembling apparatus 101 is connected to a physical layer device 5 that performs transmission and reception of a frame data to/from an ATM network.

On the other hand, the ATM cell assembling/disassembling apparatus 101 is connected via a host bus 4 to a host CPU 2 for operating an upper layer application and to a host memory 3 for storing a transmission and reception packet. The host CPU 2 also performs management of the host memory 3 and issues commands to the ATM cell assembling/disassembling apparatus 101.

The ATM cell assembling/disassembling apparatus 101 includes: a cell reception/disassembling block 106 for performing cell reception and disassembling; a cell assembling/transmission block 107 for performing assembling of a transmission cell and transmission of the cell; and a reception VC address-transmission/reception parameter storage block 109 for storing information required for transmission and reception.

In general, a semiconductor memory is used for the reception VC address-transmission/reception parameter storage block 109. Moreover, a memory interface block 108 performing memory access control is provided together with the VC address-transmission/reception parameter storage block 109.

The cell reception/disassembly block 106 is constituted by: a reception controller 120 mainly performing a cell reception and cell disassembling; and a reception data buffer 121 for temporarily storing a 48-byte payload data extracted from a cell by the reception controller 120.

The cell assembly/transmission block 107 performing cell assembling and transmission is constituted by transmission controller 125 mainly performing a cell assembling and transmission; and a transmission data buffer 126 for temporarily storing a 48-byte payload data which is used for the cell assembling performed by the transmission controller 125.

Furthermore, the ATM cell assembling/disassembling apparatus 101, for realizing an interface function with a physical layer device, includes: a cell reception interface 110 for receiving an ATM cell from a physical layer device 5, and a cell transmission interface 111 for transmitting an ATM cell to the physical layer device 5.

Moreover, the ATM cell assembling/disassembling apparatus 101 realizes an interface function for the host system by comprising: a host access block 114 for register access from the host CPU 2 and an command to the ATM cell assembling/disassembling apparatus 101; and a DMA output block 112 and a DMA input block 113 for DMA (direct memory access) data transfer to the host memory 3.

FIG. 10 is a flowchart explaining a reception operation by the ATM cell assembling/disassembling apparatus 101. Hereinafter, explanation will be given on the reception operation of the ATM cell assembling/disassembling apparatus 101 shown in FIG. 9, referring to FIG. 10.

When an ATM cell is received from the physical layer device 5 by the cell reception interface 110, the reception controller 120 references a VC identification code VPI/VCI in the 5-byte cell header. According to this VPI/VCI, the reception controller 120 determines whether the received cell belongs to a VC which the upper layer application operating on the host CPU 2 wants to receive (hereinafter, this VC will be referred to as a valid reception VC and the cell will be referred to as a valid reception cell).

The valid reception VC has been stored in the reception VC address-transmission/reception parameter storage block 109.

If the cell passed from the cell reception interface 110 is a valid reception cell, i.e., which VC is stored in the reception VC address-transmission/reception parameter storage block 109, the reception controller 120 determines to perform reception. Moreover, if the cell passed from the cell reception interface 110 is a cell of a VC not stored in the reception VC address-transmission/reception parameter storage block 109, or a cell in which VCI/VPI are all zeros (hereinafter, referred to as an invalid reception cell), the reception controller 120 determines not to perform reception (step S51).

When step S51 has determined to perform reception, the reception controller 120 reads out a reception parameter related to this VC stored in the reception VC address-transmission/reception parameter storage block 109 (step S52), and performs cell disassembling and error detection according to the parameter (step S53). Subsequently, the reception controller 120 stores the 48-byte payload data extracted from the cell, in the reception data buffer 121 and requests the DMA output block 112 to perform DMA transmission of the reception payload data (step S54).

The reception payload data stored in the reception data buffer 121 is DMA-transferred to the host memory 3 by the DMA output block 112 (step S55). This completes one cell reception processing.

It should be noted that if the reception cell is determined to be an invalid reception cell in step S51, the reception controller 120 discards the cell without performing the processes of steps S52 to S55, thus completing one cell reception processing (step S56).

The aforementioned processing is performed each time the cell reception interface 110 receives an ATM cell from the physical layer device 5, and the reception payload data transferred to the host memory 3 is assembled into a packet.

FIG. 11 is a flowchart explaining a transmission operation of the ATM cell assembling/disassembling apparatus 101 of FIG. 9. Hereinafter, explanation will be given on the transmission operation of the ATM cell assembling/disassembling apparatus 101 of FIG. 9, referring to FIG. 11.

Firstly, the transmission controller 125 determines a VC of a cell to be transmitted next according to a transmission rate information of the respective VC, i.e., valid VC (hereinafter, this VC will be referred to as a valid transmission VC and the cell will be referred to as a valid transmission cell). This decision is made for each of the cells and sometimes, in order to adjust the transmission rate, a pseudo cell in which VPI/VCI are all zeroes may be decided to be transmitted (step S61).

Next, the transmission controller 125 branches the processing depending whether the VC determined in step S61 is a valid transmission VC or pseudo cell transmission (step S62).

If the VC determined in step S61 is a valid transmission VC, the transmission controller 125 reads out a transmission parameter of the VC to be transmitted and according to the transmission parameter, determines a storage address of the transmission payload data in the host memory 3. According to this address, the transmission controller 125 requests the DMA input block 113 to DMA-transfer the payload data of one cell from the host memory 3 (step S63).

The DMA input block 113, by the DMA transfer, reads out the transmission payload data of one cell from the host memory 3 and stores the transmission payload data in the transmission data buffer 126 (step S64).

Subsequently, the transmission controller 125 creates a 48-byte transmission payload data. For creation of this transmission payload data, the transmission controller 125 firstly reads out a payload data of one cell from the transmission data buffer 126. If the payload data constitutes an end cell in a packet to be transmitted by the VC, a trailer is added to the payload data entered from the DMA input block 113. If the cell is other than the end cell, the payload data input from the DMA input block 113 is used directly. Furthermore, the transmission controller 125 also creates a 5-byte header. The transmission controller 125 creates a header and a payload and performs CRC calculation and packet length calculation required for trailer creation (step S65)

The transmission controller 125 assembles a cell from the transmission payload data and cell header (step S66).

The cell transmission interface 111 transmits an ATM cell assembled in the transmission controller 125, to the physical layer device 5. Thus, one cell transmission processing is complete (step S67).

If a pseudo cell is decided to be transmitted in step S62, the transmission controller 125 creates a cell data having a cell header in which all the VPI/VCI codes are zeroes (step S68). This data is made into a cell in step S66. The cell transmission interface 111 transmits the assembled ATM cell to the physical layer device 5. Thus, one cell transmission processing is complete (step S67).

In general, in the aforementioned ATM cell assembling/disassembling apparatus, clock is supplied to all the circuits all the time.

Moreover, the aforementioned ATM cell assembling/disassembling apparatus is usually constituted by using the clock synchronization type CMOS semiconductor technique.

The conventional ATM cell assembling/disassembling apparatus shown in FIG. 9 has a problem that power is consumed in vain, because clock is supplied to circuits which are not required for a processing.

More specifically, in the reception operation shown in FIG. 10, if it is decided in step S55 that the cell is not to be received, steps S52 to S55 are skipped. In this case, circuits related to steps S52, S53, S54 in the reception controller 120 need not operate. However, during this time, clock is supplied to these circuits.

Moreover, in the transmission operation shown in FIG. 11, if step S62 determines a pseudo cell transmission, steps S63 and S65 are skipped, but clock is supplied to the circuits related to these processes in the transmission controller 125.

In general, in a clock synchronization type CMOS semiconductor, when a clock is supplied, the power consumption increases in proportion to the clock frequency. And when no clock is supplied, the power consumption can be considered to be zero.

Thus, power is consumed in vain by supplying clock to those circuits which need not operate.

The aforementioned situation will be detailed below. It is assumed that the reception total bit rate of the ATM cell assembling/disassembling apparatus is 156 Mbps. Of the 156 Mbps, 26 Mbps is used by the cell of VC wanted by an upper layer application (this will be referred to as VC1) and VC cell not wanted by the upper layer application is continuously received at the reception rate of 52 Mbps. The remaining 78 Mbps is empty or a pseudo cell is input for rate adjustment.

Here, in steps S52, S53, and S54 in FIG. 10, operation is required only for 26÷156×100=17% at the most and the remaining 83% does not require clock supply. However, in the conventional ATM cell assembling/disassembling apparatus, clock is supplied even during the time when no VC1 cell is received, and in the circuits performing the steps S52, 53, and 54, 83% of power is consumed in vain.

Moreover, it is assumed that the transmission total bit rate of the ATM cell assembling/disassembling apparatus of FIG. 9 is 156 Mbps. When a transmission data supplied from an upper layer application is transmitted by VC2 at the transmission rate of 26 Mbps, the processes of the steps S63 and S65 need operation only during 26÷156×100=17% at the most, and the remaining 83% does not need clock supply. However, in the conventional ATM cell assembling/disassembling apparatus, clock is also supplied during the 83% when no VC2 cell is transmitted, and the circuits performing the processes of the steps S63 and S65 consume the 83% power in vain.

As has been described above, in the conventional ATM cell assembling/disassembling apparatus, clock is supplied even to the circuits which need not operate and power is consumed in vain.

SUMMARY OF THE INVENTION

It is therefore an object of the present invention to provide an ATM cell assembling/disassembling apparatus capable of reducing a power consumption by interrupting clock supply to circuits which need not operate.

The ATM cell assembling/disassembling apparatus according to the present invention is arranged on an ATM terminal of an ATM network and connected to a physical layer device (5), a host CPU (2), and a host memory (3), said apparatus comprising: cell reception unit (10, 15) for receiving a cell from the physical layer device; reception VC detection unit (16) for deciding whether the reception cell is valid according to a VPI/VCI information in a header of the reception cell; reception control unit (17) for disassembling and error checking the cell which has been decided to be valid by the reception VC detection unit; reception data storage unit (18) for temporarily storing a reception payload data extracted from the reception cell by the reception control unit; and DMA output unit (12) for reading out a reception payload data from the reception data storage unit according to a DMA transfer request from the reception control unit and DMA-transferring the reception payload data to the host memory. The ATM cell assembling/disassembling apparatus further comprises reception clock control unit (20) which starts clock supply to the reception control unit when the reception cell is decided to be valid by the reception VC detection unit, and terminates the clock supply to the reception control unit upon completion of processing for one cell by the reception control unit after the reception control unit performs cell disassembling and error check, stores a reception payload data in the reception data storage unit, and sends a request of a DMA transfer to the DMA output unit.

Moreover, the ATM assembling/disassembling apparatus, as a configuration example, comprises: transmission scheduling unit (21) for deciding a VC for the next cell to be transmitted; transmission control unit (22) for performing DMA transfer request for requesting the transmission payload data of the VC if the VC is decided to be a valid transmission VC, and according to the data fetched by the DMA transfer, creating a transmission payload data and a cell header; payload storage unit (24) for temporarily storing the transmission payload data which has been created by the transmission control unit; transmission header storage unit (25) for temporarily storing the cell header which has been created by the transmission control unit; cell assembling unit (26) for combining the cell header stored in the transmission header storage unit and the transmission payload data stored in the transmission payload storage unit, so as to create a cell; cell transmission unit (11) for transmitting the transmission cell prepared by the cell assembling unit, to the physical layer device; and DMA input unit (13) for reading out the transmission payload data from the host memory according to the DMA transfer request from the transmission control unit, and DMA-transferring the transmission payload data to the transmission control unit. The ATM cell assembling/disassembling apparatus further comprises transmission clock control unit (27) which starts clock supply to the transmission control unit when the transmission scheduling unit has decided to transmit a cell of the valid transmission VC and terminates the clock supply to the transmission control unit after the transmission control unit stores the cell header and the transmission payload data in the transmission header storage unit and the transmission payload storage unit, respectively, thus completing processing for one cell in the transmission control unit.

Moreover, the ATM cell assembling/disassembling apparatus, as a configuration example, comprises: DMA output command storage unit (19a) for storing the DMA transfer request issued as a command from the reception control unit; and DMA output clock control unit (60) which starts clock supply to the DMA output unit when the number of commands stored in the DMA output command storage unit has become one or more and terminates the clock supply to the DMA output unit if the number of commands stored in the DMA output command storage unit is 0 when DMA transfer of one command is completed by the DMA output unit. The DMA output unit (12a) operates according to the clock, reads out a command from the DMA output command storage unit and performs DMA transfer according to the command which has been read out.

Moreover, the ATM cell assembling/disassembling apparatus, as a configuration example, comprises: DMA input command storage unit (23a) for storing the DMA transfer request issued as a command from the transmission control unit; and DMA input clock control unit (61) which starts clock supply to the DMA input unit when the number of commands stored in the DMA input command storage unit has become one or more and terminates the clock supply to the DMA input unit if the number of commands stored in the DMA input command storage unit is 0 when DMA transfer of one command is completed by the DMA input unit. The DMA input unit (13a) operates according to the clock, reads out a command from the DMA input command storage unit and performs DMA transfer according to the command which has been read out.

Moreover, the reception control unit (17b) outputs a write-in signal (82) indicating that a reception payload data is being written into the reception data storage unit (18); and the DMA output unit (12b) outputs a read-out signal (81) indicating that a reception payload data is being read out from the reception data storage unit. The ATM cell assembling/disassembling apparatus further comprises reception data storage clock control unit (80) which, referencing the write-in signal and the read-out signal, supplies a write-in clock to the reception data storage unit only if the write-in signal indicates that a data is being written in and supplies a read-out clock to the reception data storage unit only if the read-out signal indicates that a data is being read out.

Moreover, the transmission control unit (22b) outputs a write-in signal (91) indicating that a transmission payload data is being written into the transmission payload storage unit (24); and the cell assembling unit (26b) outputs a read-out signal (92) indicating that a transmission payload data is being read out from the transmission payload storage unit. The ATM cell assembling/disassembling apparatus further comprises transmission payload storage clock control unit (90) which references the write-in signal and the read-out signal and supplies a write-in clock to the transmission payload storage unit only if the write-in signal indicates that a data is being written in, and supplies a read-out clock to the transmission payload storage unit only if the read-out signal indicates that a data is being read out.

DESCRIPTION OF THE PREFERRED EMBODIMENTS

Description will now be directed preferred embodiments with reference to the attached drawings.

Embodiment 1

Figure 1:
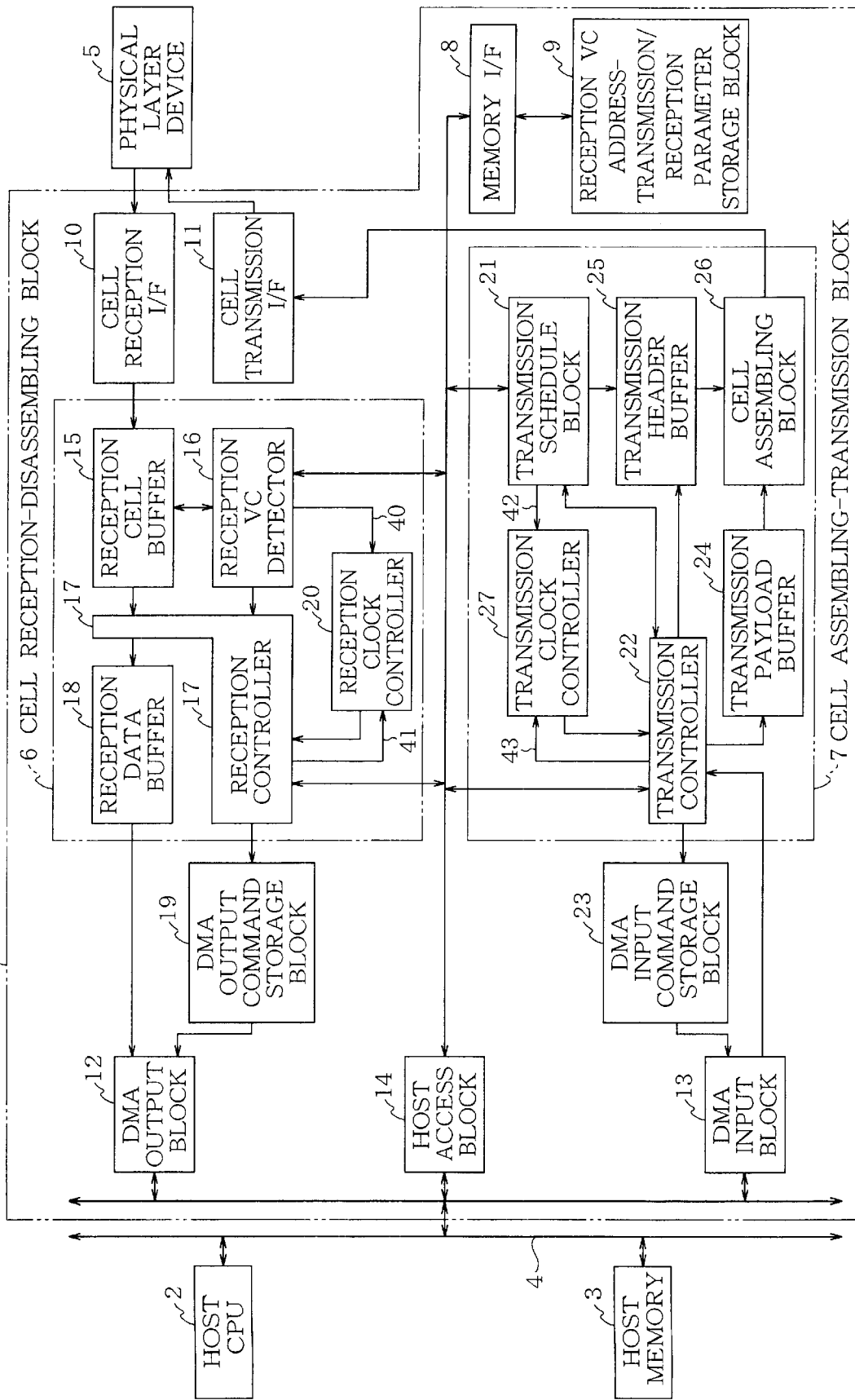
FIG. 1 is a block diagram showing a configuration of an ATM cell assembling/disassembling apparatus according to a first embodiment of the present invention.

FIG. 1 is a block diagram showing a configuration of an ATM cell assembling/disassembling apparatus according to a first embodiment of the present invention.

In the conventional apparatus, even when no valid cell is received, clock is supplied to circuits performing disassembling of a received cell and error check. In contrast to this, the present invention provides reception block clock control unit for supplying clock to the aforementioned circuits only when a valid cell is received.

Moreover, in the conventional apparatus, even when no valid cell is transmitted, clock is supplied to a circuit for creating a valid transmission cell data. In contrast to this, the present invention provides transmission block clock control unit for supplying the aforementioned circuit only when transmitting a valid cell.

Figure 9:
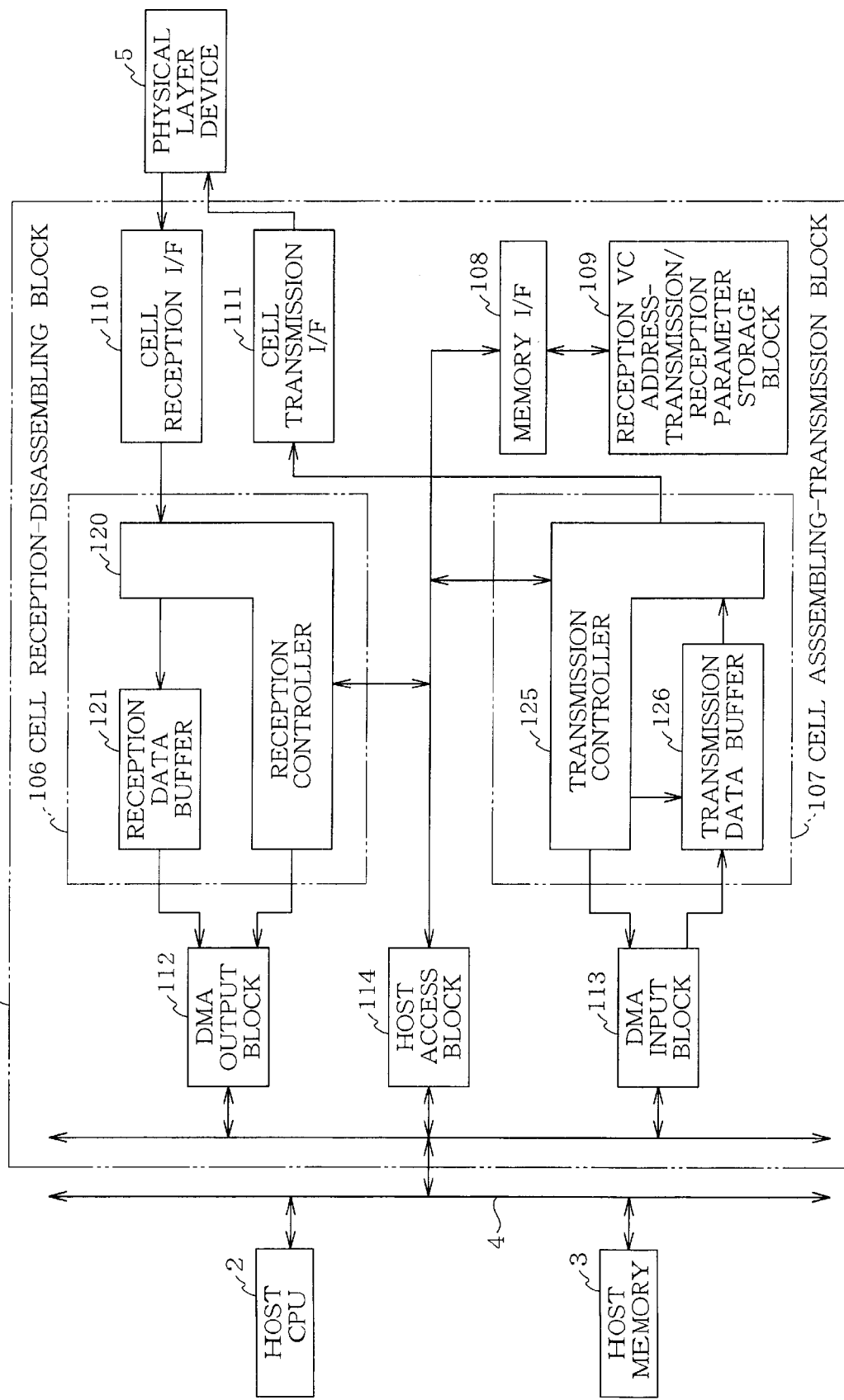
FIG. 9 is a block diagram showing a configuration of a conventional ATM cell assembling/disassembling apparatus.
Figure 10:
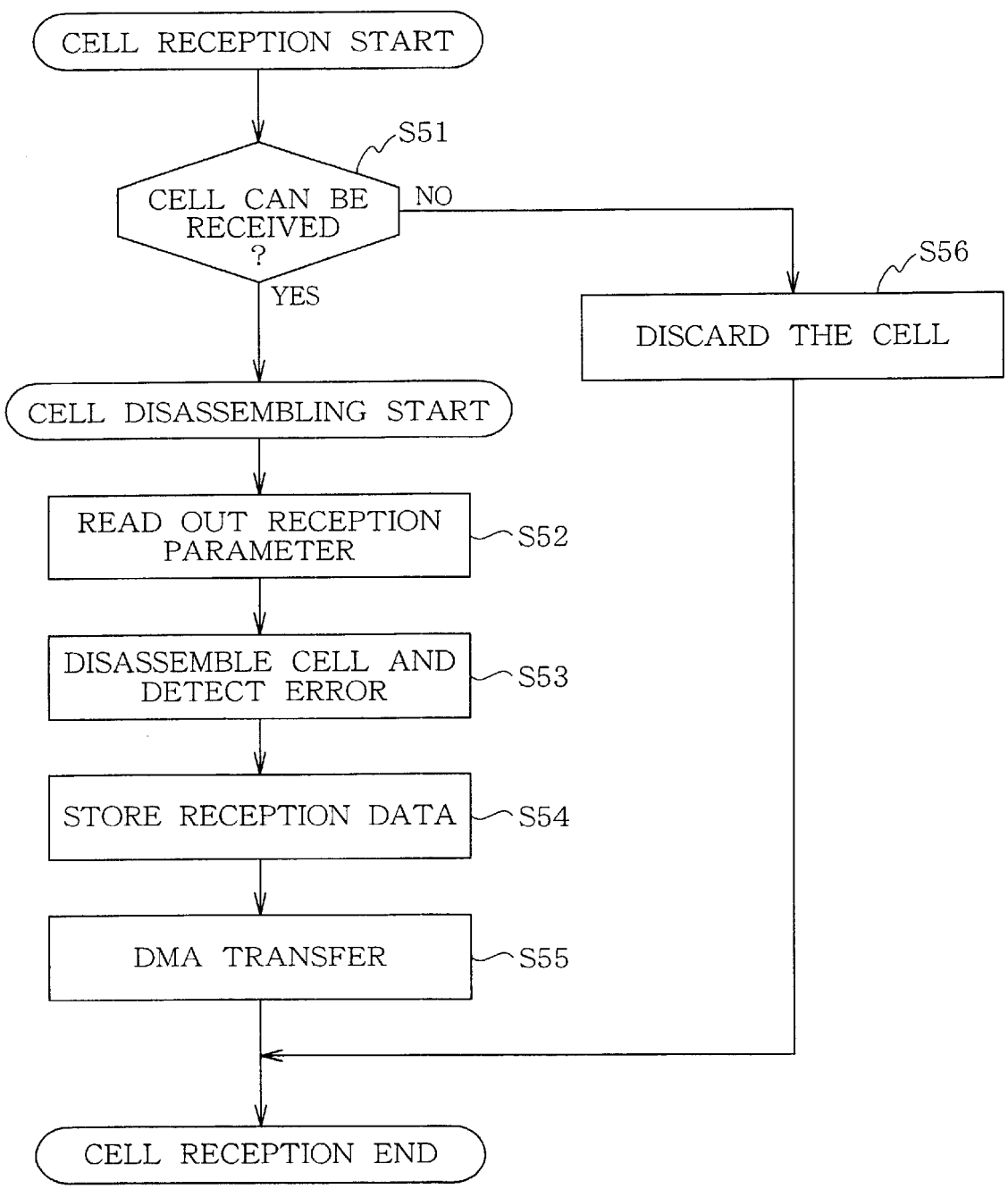
FIG. 10 is a flowchart showing a reception operation of the ATM cell assembling/disassembling apparatus of FIG. 9.
Figure 11:
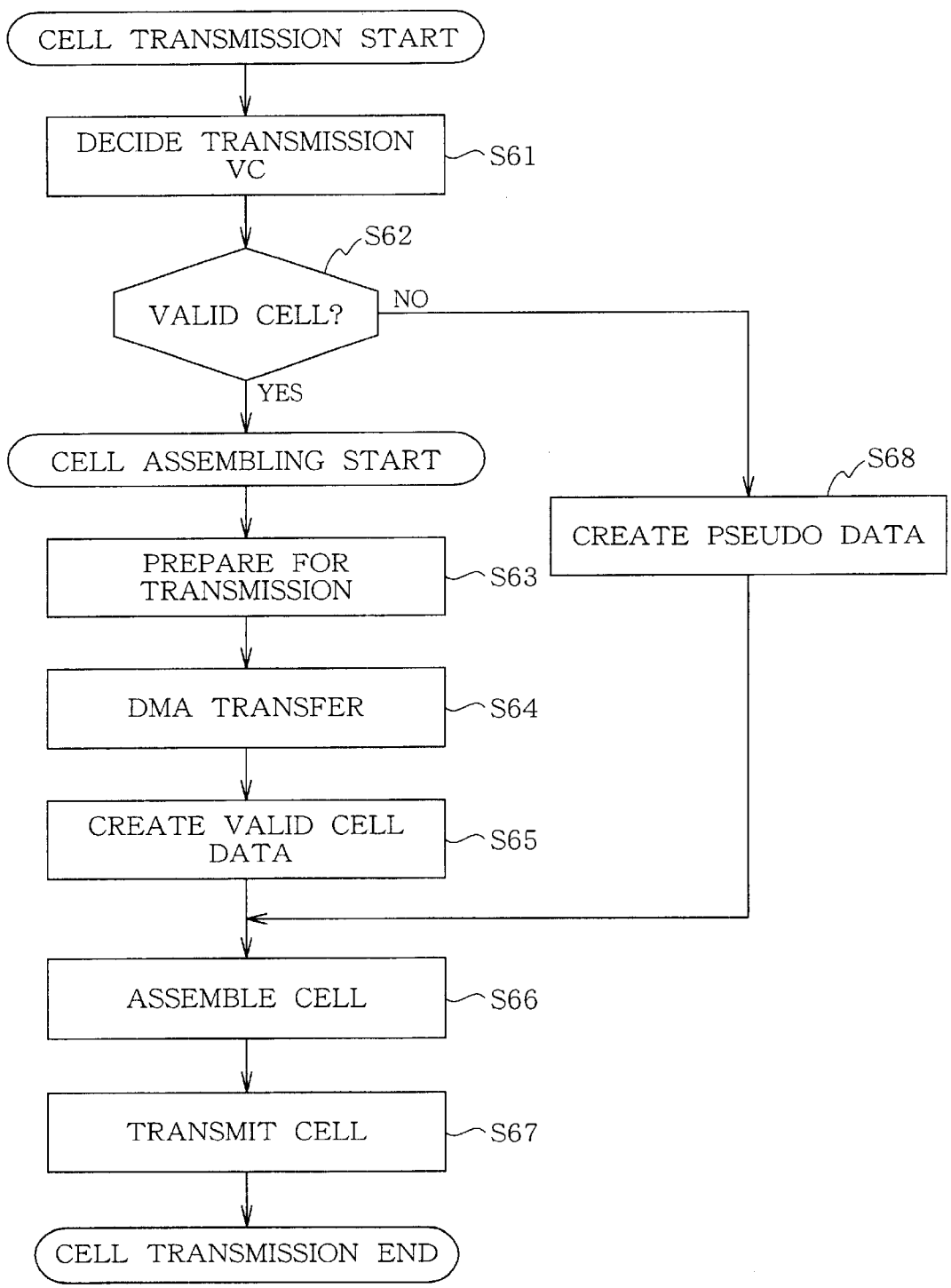
FIG. 11 is a flowchart showing a transmission operation of the ATM cell assembling/disassembling apparatus of FIG. 9.

As shown in FIG. 1, like the ATM cell assembling/disassembling apparatus 101 of FIG. 9, the ATM cell assembling/disassembling apparatus 1 according to the first embodiment is connected to a physical layer device 5 for transmitting and receiving a frame data to/from an ATM network.

Moreover, the ATM cell assembling/disassembling apparatus 1 is connected via a host bus 4 to a host CPU 2 causing an upper layer application to operate and a host memory 3 for storing transmission/reception packets. The host CPU 2 also performs management of the host memory 3 and issues an command to the ATM cell assembling/disassembling apparatus 1.

The ATM cell assembling/disassembling apparatus 1 includes: a cell reception-disassembling block 6 for receiving and disassembling a cell; a cell assembling transmission block 7 for assembling and transmitting a cell; and a reception VC address-transmission/reception parameter storage block 9 for storing information required for transmission and reception.

The VC address-transmission/reception parameter storage block 9 is normally constituted by a semiconductor memory. Moreover, a memory interface 8 is provided together with the storage block, for controlling memory access to the VC address-transmission/reception parameter storage block 9.

Furthermore, the ATM cell assembling/disassembling apparatus 1 includes, as a configuration for implementing interface function with a physical layer device, a cell reception interface 10 for receiving an ATM cell from the physical layer device 5 and a cell transmission interface 11 for transmitting an ATM cell to the physical layer device 5.

Moreover, the ATM cell assembling/disassembling apparatus 1 includes, as a configuration for implementing interface function with the host system, a host access block 14 for processing a register access from the host CPU 2 and an command from the host CPU 2 to the ATM cell assembling/disassembling apparatus 1; and a DMA output block 12 and a DMA input block 13 for performing DMA (direct memory access) data transfer to/from the host memory 3.

Between the DMA output block 12 and the cell reception-disassembling block 6, there is provided a DMA output command storage block 19 for temporarily storing a DMA transfer request from the cell reception-disassembling block 6.

Moreover, between the DMA input block 13 and the cell assembling-transmission block 7, there is provided a DMA input command storage block 23 for temporarily storing a DMA transfer request from the cell assembling-transmission block 7.

The DMA output block 12 and the DMA output command storage block 19 realize the function identical to that of the DMA output block 112 of FIG. 9.

The DMA input block 13 and the DMA input command storage block 23 realize the function identical to that of the DMA input block 113 of FIG. 9.

The cell reception-disassembling block 6 includes: a reception cell buffer 15 for temporarily storing a cell supplied from the cell reception interface 10; a reception VC detector 16 for reading out a header of the cell temporarily stored and determines whether the reception cell is a valid reception cell; a reception controller 17 for performing a cell disassembling and an error check; and a reception data buffer 18 for storing a 48-byte payload data extracted from the cell by the reception controller 17.

The reception cell buffer 15, the reception VC detector 16, the reception controller 17, and the reception data buffer 18 realize a function identical to that of the cell reception-disassembling block 106 of FIG. 9.

Note that the reception controller 17 realize a function identical to that of the circuits related to the steps S52, S53, and S54 of the reception controller 120 of FIG. 9.

The cell assembling-transmission block 7 includes: a transmission scheduler 21 for deciding the next VC to be transmitted; a transmission controller 22 for creating a cell header and a cell payload data for transmitting the cell of the VC determined by the transmission scheduler 21; a transmission header buffer 25 for temporarily storing the header created by the transmission controller 22; a transmission payload buffer 24 for temporarily storing the payload data created by the transmission controller 22; and a cell assembling block 26 for assembling a cell from the header stored in the transmission header buffer 25 and the payload data stored in the transmission payload buffer 24 and transmitting the cell to the cell transmission interface 11.

The transmission scheduler 21, the transmission controller 22, the transmission payload buffer 24, the transmission header buffer 25, and the cell assembling block 26 realize a function identical to that of the cell assembling-transmission block 107 in FIG. 9.

Note that the transmission controller 22 realizes a function identical to that of the circuits related to the steps S63 and S65 in the transmission controller 125 of FIG. 9.

The aforementioned configuration is the configuration of the conventional ATM cell assembling/disassembling apparatus 101 which has been subdivided.

In addition, the ATM cell assembling/disassembling apparatus 1 of the present embodiment further includes in the cell reception-disassembling block 6, a reception clock controller 20 as clock supply control unit for the reception controller 17.

Moreover, in the cell assembling-transmission block 7, there is provided a transmission clock controller 27 as clock supply unit for the transmission controller 22.

The reception clock controller 20 operates as follows. When a cell of VC which an upper layer application operating on the host CPU 2 wants to receive is received, a clock supply for the reception controller 17 is started, and when a processing for one cell is complete in the reception controller 17, the clock supply to the reception controller 17 is terminated.

That is, when no valid cell is received by the ATM cell assembling/disassembling apparatus 1, or when an invalid VC cell is input, no clock is supplied to the reception controller 17, thus reducing the power consumption in the reception controller 17.

The transmission clock controller 27 operates as follows. When the transmission scheduler 21 has decided that one cell is to be transmitted by the VC wanted by an upper layer application operating on the host CPU 2, the transmission clock controller 27 starts clock supply to the transmission controller 22, and when processing for one cell is complete in the transmission controller 22, the transmission clock controller 27 terminates clock supply to the transmission controller 22.

Thus, when no cell of VC is wanted by the upper layer application operating on the host CPU 2, no clock is supplied to the transmission controller 22, thus reducing the power consumption in the transmission controller 22. This reduces the power consumption of the ATM cell assembling/disassembling apparatus 1.

Figure 2:
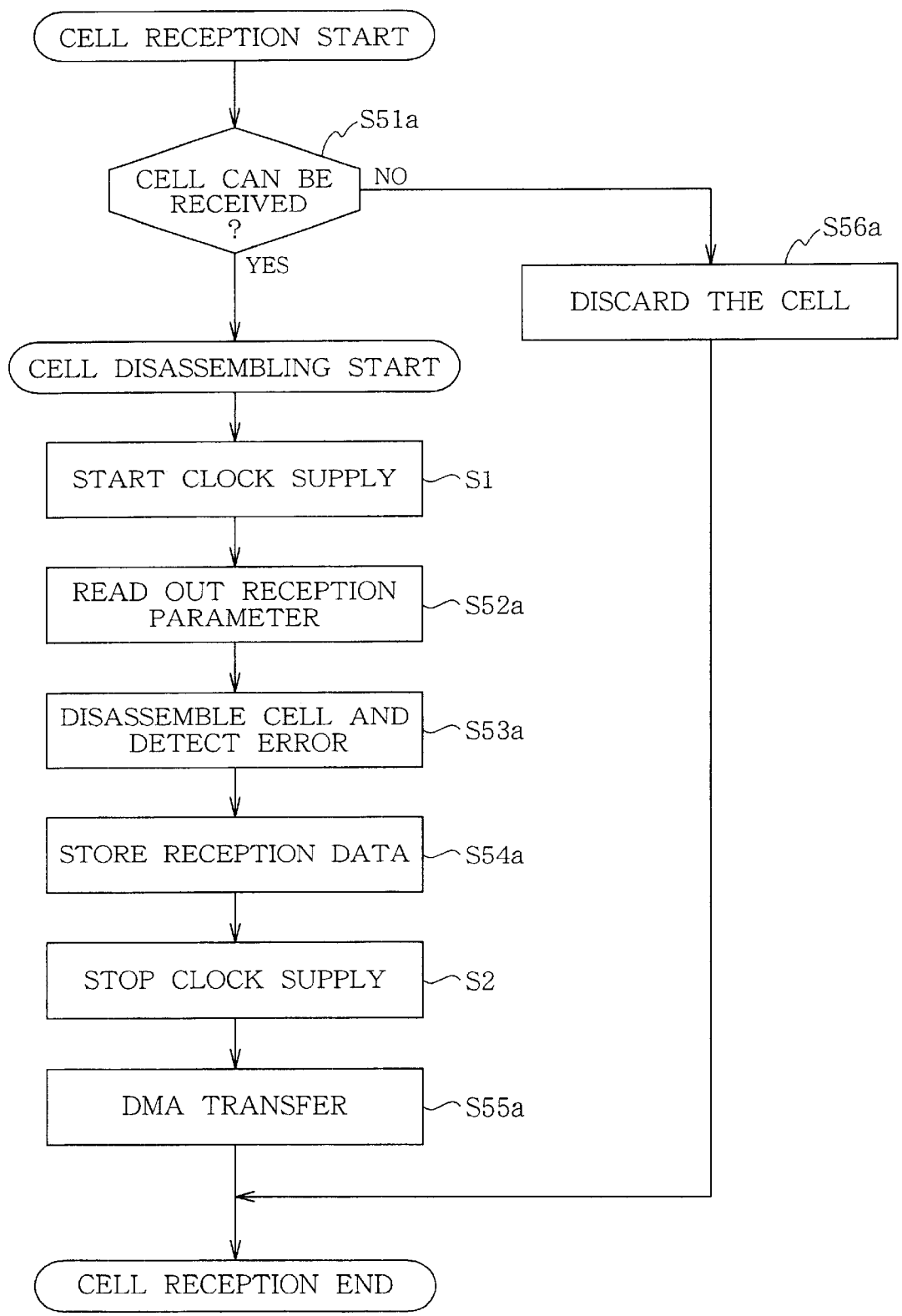
FIG. 2 is a flowchart showing a reception operation of the ATM cell assembling/disassembling apparatus of FIG. 1.

FIG. 2 is a flowchart showing a reception operation of the ATM cell assembling/disassembling apparatus 1 of FIG. 1. Hereinafter, explanation will be given on the reception operation of the ATM cell assembling/disassembling apparatus 1 of FIG. 1, with reference to FIG. 2.

A reception cell received by the physical layer device 5 is temporarily stored in the reception cell buffer 15 via the cell interface 10.

The reception VC detector 16 reads a header of the reception cell stored in the reception cell buffer 15 and checks the VPI/VCI in the header so as to determine whether the reception cell is a valid reception cell (cell of VC wanted by an upper layer application) (step S51*a*).

A valid reception VC has been stored in the reception VC address-transmission/reception parameter storage block 9. Accordingly, the reception VC detector 16 decides that the cell is a valid reception cell if it is a cell of VC stored in the reception VC address-transmission/reception parameter storage block 9.

When the cell is decided to be a valid cell in step S51, the reception VC detector 16 outputs to the reception clock controller 20, a reception VC detection signal 40 indicating that a valid reception cell has been received.

Upon reception of the reception VC detection signal 40, the reception clock controller 20 starts clock supply to the reception controller 17 (step S1).

When clock is supplied, the reception controller 17 reads out, via the memory interface 8, a reception parameter related to the VC stored in the reception VC address transmission/reception parameter storage block 9 (step S52*a*), and according to this parameter, the reception controller 17 performs disassembling of the reception cell stored in the reception cell buffer 15 and error detection (step S53*a*) Subsequently, the reception controller 17 stores a reception payload data extracted from the cell, into the reception data buffer 18, and then stores a DMA output command in the DMA output command storage block 19, so as to DMA-transfer the reception payload data. At this point, in the reception controller 17, processing for one cell is complete. The reception controller 17 outputs to the reception clock controller 20, a reception processing end signal 41 indicating that reception processing for one cell is complete (step S54*a*).

Upon reception of the reception processing end signal 41, the reception clock controller 20 terminates clock supply to the reception controller 17 (step S2).

The DMA output block 12 reads out a DMA output command from the DMA output command storage block 19, and according to the command read out, DMA-transfers a reception payload data stored in the reception data buffer 18, to the host memory 3. At this point, a reception processing for one cell is complete (step S55*a*).

It should be noted that if step S51*a* decides that the cell is an invalid reception cell, the processes of the steps S52*a* to S55*a* are not performed, and the cell is discarded, thus completing one cell reception processing (step S56*a*) The aforementioned processing is performed each time one ATM cell is received from the physical layer device 5 by the cell reception interface 10. The reception payload data transferred to the host memory 3 is assembled into a packet.

Figure 3:
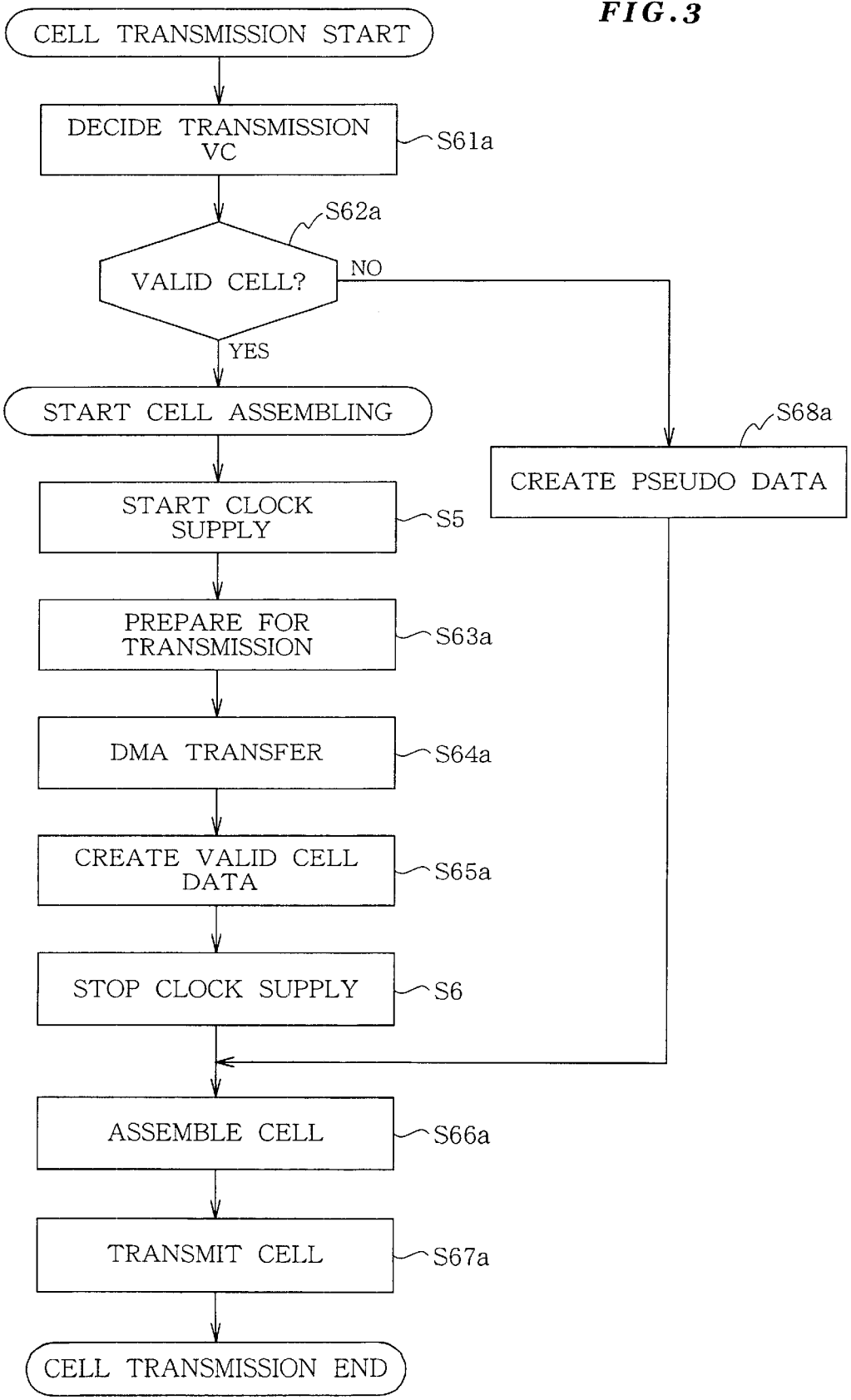
FIG. 3 is a flowchart showing a transmission operation of the ATM cell assembling/disassembling apparatus of FIG. 1.

FIG. 3 is a flowchart showing transmission operation of the ATM cell assembling/disassembling apparatus 1 of FIG. 1. Hereinafter, referring to FIG. 3, explanation will be given transmission operation of the ATM cell assembling/disassembling apparatus 1.

Firstly, the transmission scheduler 21 decides a VC of the next cell to be transmitted according to the transmission rate information of the respective VC wanted to be transmitted by an upper layer application on the host CPU 2 (step S61*a*).

This decision is performed for each of the one-cell transmissions, and sometimes, for adjusting the transmission rate, it is decided to transmit a pseudo cell having a cell header in which the VPI/VCI are all zeroes.

Next, the transmission scheduler 21 branches the process depending whether the VC decided in step S61*a* is a valid transmission VC (i.e., VC which is wanted to be transmitted by the upper layer application) or a pseudo VC (step S62*a*).

If the VC decided in step S61*a* is a valid transmission VC, the transmission schedulers outputs to the transmission clock controller 27, a valid VC transmission decision signal 42 indicating that a valid transmission VC has been decided for the cell to be transmitted.

Upon reception of the valid VC transmission decision signal 42, the transmission clock controller 27 starts clock supply to the transmission controller 22 (step S5).

When clock is supplied, the transmission controller 22 fetches a VC number to be transmitted from the transmission scheduler 21 and reads out a transmission parameter of this VC from the reception VC address-transmission/reception parameter storage block 9. According to the transmission parameter read out, the transmission controller 22 obtains a storage address of the transmission payload data in the host memory 3. Then, according to this storage address, the transmission controller 22 requests the DMA input block 13 to DMA-transfer a transmission payload data for one cell from the host memory 3 into the ATM cell assembling/disassembling apparatus 1 by storing a DMA input command in the DMA input command storage block 23 (step S63*a*).

The DMA input block 13 reads out the DMA input command from the DMA input command storage block 23 and according to the command read out, DMA-transfers a transmission payload data for one cell from the host memory 3 to the transmission controller 22 (step S64a).

The transmission controller 22 creates a 5-byte cell header and a 48-byte payload data as an originating data for generation of a transmission cell.

If the payload data is used for assembling an end cell to be transmitted via the VC, a trailer is added to the payload data entered from the DMA input block 13. Unless the cell is the end cell, the payload data entered from the DMA input block 13 is used as it is.

The transmission controller 22 creates a header data and a payload data while performing CRC calculation and packet length calculation required for trailer creation. The transmission controller 22 stores the payload data in the transmission payload buffer 24 and then stores the cell header created, in the transmission header buffer 25.

At this point, in the transmission controller 22, processing for one cell is complete and the transmission controller 22 outputs to the transmission clock controller 27, a transmission processing end signal 43 indicating that transmission processing for one cell is complete in the transmission controller 22 (step S65a).

Upon reception of the transmission processing end signal 43, the transmission clock controller 27 terminates clock supply to the transmission controller 22 (step S6).

The cell assembling block 26 reads out a cell header of the transmission cell from the transmission header buffer 25. Unless the VPI/VCI in this header are all zeroes, the cell assembling block 26 reads out payload data of one cell from the transmission payload buffer 24 and adds to this payload data a cell header read out from the transmission header buffer 25, so as to assemble a cell (step S66a).

An ATM cell assembled in the cell assembling block is transmitted by to the physical layer device 5 by the cell transmission interface 11. Thus, transmission processing for one cell is complete (step S67a).

If a pseudo cell is identified in step S62a, the transmission scheduler 21, in order to transmit the pseudo cell, creates a cell header in which VPI/VCI are all zeroes and stores the cell header in the transmission header buffer 25 (step S68a).

The cell assembling block 26 reads out a cell header of a transmission cell from the transmission header buffer 25. If the VPI/VCI in the header are all 0, the cell assembling block creates a payload data in which all the 48-byte data are 0 and adds the payload data to the cell header, so as to create a pseudo cell for transmission rate adjustment (step S66a).

The cell transmission interface 11 transmits the ATM cell assembled in the cell assembling block 26, to the physical layer device 5. Thus, transmission processing for one cell is complete (step S67a).

As has been described above, in this embodiment, the clock supply to the reception controller 17 can be summarized as follows.

(a) When the reception VC detector 16 has detected a valid reception cell, the reception clock controller 20 provided by the present invention starts clock supply to the reception controller 17 and the reception controller starts processing.

(b) When processing for one cell is complete in the reception controller 17, the reception clock controller 20 provided by the present invention terminates clock supply to the reception controller 17.

That is, no clock is supplied to the reception controller 17 when no valid reception cell is received by the ATM cell assembling/disassembling apparatus 1 or when an invalid VC cell is input. Thus, power consumption in the reception controller 17 during this time can be reduced.

Operation of the present embodiment will be more specifically, assuming that the reception total bit rate of the ATM cell assembling/disassembling apparatus is 156 Mbps. For this ATM cell assembling/disassembling apparatus, 26 Mbps is assumed for the cell of the VC wanted by an upper layer application operating on the host CPU 2 (this VC will be referred to as VC1a) and 52 Mbps is assumed for a cell of the VC not wanted by the upper layer application. As for the remaining reception rate of 78 Mbps, nothing is input or a pseudo cell is input for rate adjustment.

Here, the reception controller 17 is supplied with clock only during 26÷156×100=17% for receiving the VC1a, and no clock is supplied for the remaining 83%, during which the clock has been supplied in the conventional apparatus.

Accordingly, the present invention reduces the power consumption of 83% in the reception controller 17.

Moreover, in this embodiment, the clock supply to the transmission controller 17 can be summarized as follows.

(a) When the transmission scheduler 21 has decided to transmit one cell via the valid transmission VC, the transmission clock controller 27 provided by the present invention starts clock supply to the transmission controller 22 and the transmission controller 22 starts processing.

(b) When processing for one cell is complete in the transmission controller 22, the transmission clock controller 20 provided by the present invention terminates clock supply to the transmission controller 22. That is, no clock is supplied to the transmission controller 22 when the ATM cell assembling/disassembling apparatus 1 is not transmitting a cell of VC wanted to be transmitted by an upper layer application operating on the host CPU 2. Thus, power consumption in the transmission controller 22 during this time can be reduced.

If the transmission total bit rate of the ATM cell assembling/disassembling apparatus 1 is assumed to be 156 Mbps, when a transmission data supplied from an upper layer application is transmitted by VC2 at the transmission rate of 26 Mbps, the transmission controller 22 is supplied with clock only during 26÷156×100=17%. No clock is supplied for the remaining 83%.

Thus, the present invention reduces power consumption of 83% in the transmission controller 22.

Embodiment 2

Figure 4:
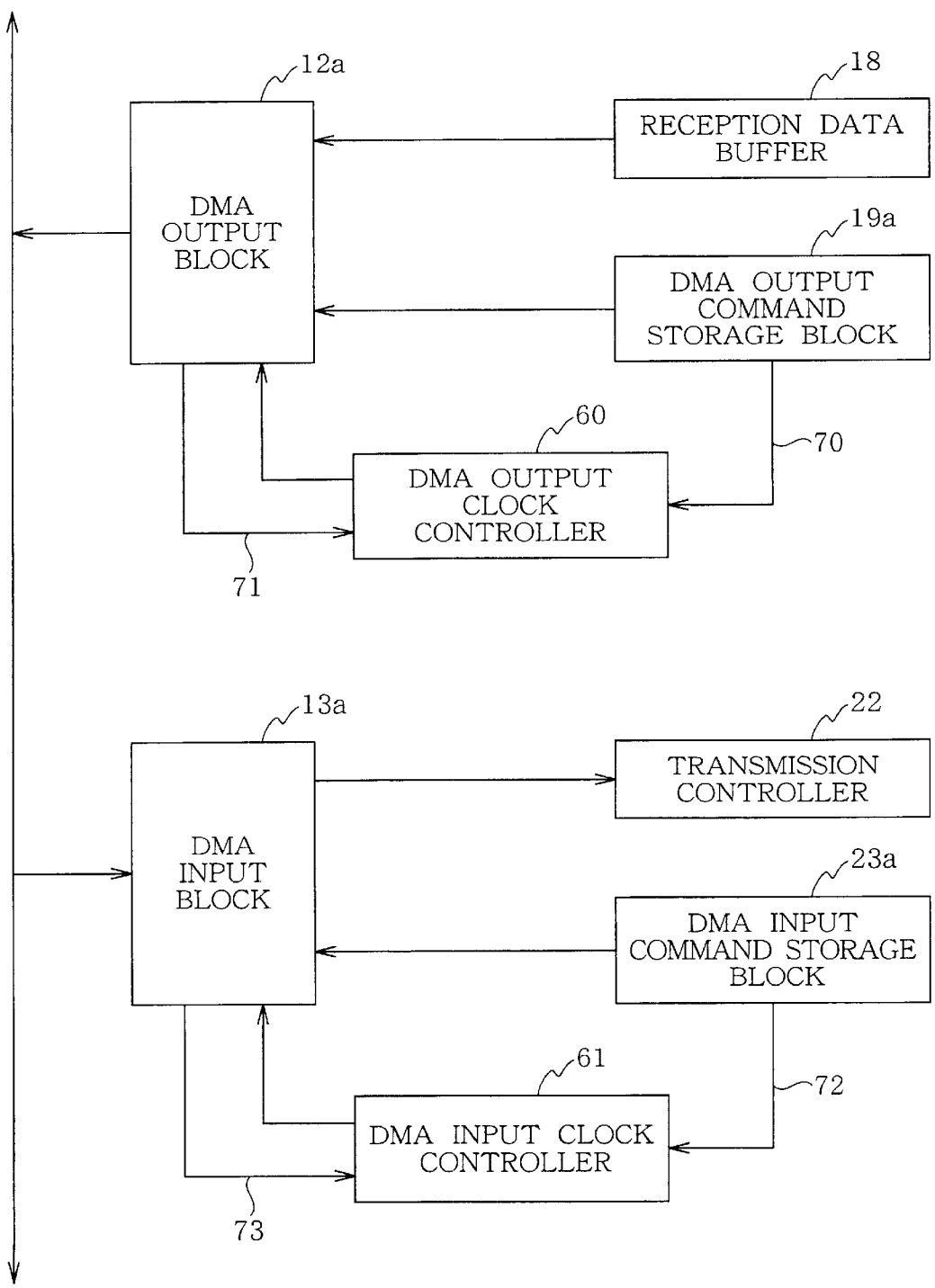
FIG. 4 is a block diagram showing a configuration of an ATM cell assembling/disassembling apparatus according to a second embodiment of the present invention.

FIG. 4 is a block diagram showing a configuration of an ATM cell assembling/disassembling apparatus according to a second embodiment of the present invention. Note that FIG. 4 shows only those parts which are different from the configuration of FIG. 1.

The ATM cell assembling/disassembling apparatus according to the second embodiment reduces power consumption in a circuit related to the DMA transfer.

That is, in the ATM cell assembling/disassembling apparatus of FIG. 1, clock is supplied to a circuit performing DMA output of a reception data even when no DMA output transfer of a reception data is being performed. The ATM cell assembling/disassembling apparatus of the second embodiment includes DMA output clock control unit for supplying clock to the aforementioned circuit only when performing DMA output transfer of a reception data.

Moreover, in the ATM cell assembling/disassembling apparatus 1 of FIG. 1, clock is supplied to a circuit which performs DMA input transfer of a transmission data even when no DMA input transfer of a transmission data is being performed. In contrast to this, the ATM cell assembling/disassembling apparatus of the second embodiment includes DMA input clock control unit for supplying clock to the aforementioned circuit only when performing DMA input transfer of a transmission data.

The ATM cell assembling/disassembling apparatus of the second embodiment has a basic configuration identical for that of the first embodiment, but the second embodiment includes a DMA output clock controller 60 and a DMA input clock controller 61.

Hereinafter, explanation will be given on the difference between the ATM cell assembling/disassembling apparatus of the second embodiment and the ATM cell assembling/disassembling apparatus of the first embodiment.

The DMA output command storage block 19a outputs to the DMA output clock controller, an output request check signal 70 which is "0" when no DMA output command is stored and "1" when a DMA output command is present. The other operation is identical to the DMA output command storage block 19 of the first embodiment.

The DMA output command storage block 19a can have a counter which is incremented when a command is stored and decremented when a command is read out so as to know the number of commands stored in the DMA output command storage block 19a.

The DMA output block 12a outputs a DMA output end signal 71 to the DMA output clock controller 60 upon completion of a processing of one DMA output command stored in the DMA output command storage block 19a. The other operation is identical to that of the DMA output block 12 of the first embodiment.

DMA output clock controller 60 starts clock supply to the DMA output block 12a when one or more than one commands are stored in the DMA output command storage block 19a, i.e., when the output request check signal 70 is "1". The DMA output clock controller 60 terminates clock supply to the DMA output block 12a when a DMA transfer processing is completed by the DMA output block 12a and no DMA output command is stored in the DMA output command storage block 19a, i.e., when the output request check signal is "0".

On the other hand, the DMA input command storage 23a outputs to the DMA input clock controller 61, an input request check signal 72 which is "0" when no DMA input command is stored and "1" when a DMA input command is present. The other operation is identical to the DMA input command storage block 23 of the first embodiment.

The DMA input command storage block 23a can have a counter which is incremented when a command is stored and decremented when a command is read out so as to know the number of commands stored in the DMA input command storage block 23a.

The DMA input block 13a outputs a DMA input end signal 73 to the DMA input clock controller 61 upon completion of a processing of one DMA input command stored in the DMA input command storage block 23a. The other operation is identical to that of the DMA input block 13 of the first embodiment.

DMA input clock controller 61 starts clock supply to the DMA input block 13a when one or more than one commands are stored in the DMA input command storage block 23a, i.e., when the input request check signal 70 is "1". The DMA input clock controller 61 terminates clock supply to the DMA input block 13a when a DMA transfer processing is completed by the DMA input block 13a and no DMA input command is stored in the DMA input command storage block 23a, i.e., when the input request check signal is "0".

The basic operation of the ATM cell assembling/disassembling apparatus of the second embodiment is identical to that of the first embodiment except for that in step S55a of the reception operation shown in FIG. 2 and in step S64a of the transmission operation shown in FIG. 3, clock control operations to the DMA output block 12a and to the DMA input block 13a are added.

Hereinafter, explanation will be given on the DMA transfer in a reception operation of the ATM cell assembling/disassembling apparatus of the second embodiment.

The reception controller 17, in step S54a of FIG. 2, stores a DMA output command in the DMA output command storage block 19a.

The DMA output command storage block 19a, when containing one or more DMA output commands, outputs to the DMA output clock controller 60, the output request check signal 70 whose value is "1". It should be noted that a plurality of DMA output commands may be issued when a 48-byte reception data is to be DMA-transferred is divided into two parts destined to different addresses.

When the output request check signal 70 has become "1", the DMA output clock controller 60 starts clock supply to the DMA output block 12a.

When supplied with the clock, the DMA output block 12a reads out one DMA output command from the DMA output command storage block 19a and performs DMA transfer according to the command which has been read out.

When a DMA command is read out, if no more DMA output command is contained, the DMA output command storage block 19a outputs to the DMA output clock controller 60, the output request check signal 70 whose value is "0".

When the DMA transfer is complete, the DMA output block 12a outputs the DMA output end signal 71 to the DMA output clock controller 60.

The DMA output clock controller 60 terminates clock supply to the DMA output block 12a if the output request check signal 70 is "0" when the DMA output end signal 71 is output.

If the output request check signal 70 is not "0", when the DMA output end signal 71 is output, because a DMA output command is still contained in the DMA output command storage block 19a or a new command is added, the DMA output clock controller 60 continues clock supply to the DMA output block 12a. In this case, the DMA output block 12a repeats the DMA output command read out and DMA transfer until the output request check signal 70 becomes "0".

With the aforementioned configuration, clock is supplied to the DMA output block 12a only while processing a DMA output command stored in the DMA output command storage block 19a, and no clock is supplied during the remaining period of time.

Accordingly, clock is supplied to the DMA output block 12a only when a valid reception cell is received by the ATM cell assembling/disassembling apparatus and the DMA transfer of the reception data is performed.

For more specific explanation of the operation of the present embodiment, the ATM cell assembling/disassembling apparatus is assumed to have a reception total bit rate of 156 Mbps. When a cell of a valid reception VC is successively received by the ATM cell assembling/disassembling apparatus from the physical layer device 5 at the reception rate of 26 Mbps, clock is supplied to the DMA output block 12a during 26÷156×100=17% at the maximum, and no clock is supplied for the remaining 83% period of time.

In the first embodiment, the DMA output block 12 has no clock supply control unit for supplying clock according to presence/absence of a DMA output command, and clock is supplied all the time. In contrast to this, the second embodiment can reduce the power consumption of 83% in the DMA output block 12a.

Next, explanation will be given on the DMA transfer operation in a transmission operation of the ATM cell assembling/disassembling apparatus of the present embodiment.

The transmission controller 22, in step S63a of FIG. 3, stores a DMA input command in the DMA input command storage block 23a.

When one or more DMA input commands are contained, the DMA input command storage block 23a outputs to the DMA input clock controller 61 the input request check signal 72 whose value is "1". It should be noted that the a plurality of DMA input commands may be issued when a transmission data of one cell is divided into two or more groups so as to be DMA-transferred from different addresses.

When the input request check signal 72 has become "1", the DMA input clock controller 61 starts clock supply to the DMA input block 13a.

When clock is supplied, the DMA input block 13a reads out a DMA input command from the DMA input command storage block 23a and performs a DMA transfer according to the command which has been read out.

If the number of commands stored becomes 0 when a DMA input command is read out, the DMA input command storage block 23a outputs to the DMA input clock controller 61, an input request check signal 72 whose value is "0".

When the DMA transfer is complete, the DMA input block 13a outputs a DMA input end signal 73 to the DMA input clock controller 61.

If the input request check signal 72 is 0 when the DMA input end signal 73 is output, the DMA input clock controller 61 terminates clock supply to the DMA input block 13a.

If the input request check signal 72 is not 0 when the DMA input end signal 73 is output, i.e., if a DMA input command is still remaining in the DMA input command storage block 23a or a new DMA command has been added, the DMA input clock controller 61 continues clock supply to the DMA input block 13a. In this case, the DMA input block 13a repeats the DMA command read out and DMA transfer until the input request check signal 72 becomes "0".

With the aforementioned configuration, the DMA input block 13a is supplied with clock only during a processing of a DMA input command stored in the DMA input command storage block 23a, and no clock is supplied for the remaining period of time.

Accordingly, clock is supplied to the DMA input block 13a only during the DMA transfer of a transmission data performed for transmitting a valid transmission cell by the ATM cell assembling/disassembling apparatus.

If the transmission total bit rate of the ATM cell assembling/disassembling apparatus of the present embodiment is assumed to be 156 Mbps, and if a cell of a valid transmission VC is transmitted at the transmission rate of 26 Mbps, the DMA input block 13a is supplied with clock only during 26÷156×100=17% at the most, and no clock is supplied for the remaining 83% period of time.

In the first embodiment, the DMA input block 13 has no unit for control ling c lock supply according to the presence/absence of a DMA input command, and clock is supplied all the time. In contrast to this, in the second embodiment, the DMA input block 13a can reduce the power consumption by 83%.

As has been described above, in the second embodiment, the ATM cell assembling/disassembling apparatus of the first embodiment further includes the DMA output clock controller 60 which starts clock supply to the DMA output block 12a when one or more than one DMA output commands are stored in the DMA output command storage block 19a, and terminates clock supply to the DMA output block 12a when the DMA output block 12a has completed a DMA transfer processing and no DMA output command is stored in the DMA output command storage block 19a.

Furthermore, the second embodiment includes a DMA input clock controller 61 which starts clock supply to the DMA input block 13a when one or more than one DMA input commands are stored in the DMA input command storage block 23a, and terminates the clock supply when the DMA input block 13a has completed a DMA transfer processing and no DMA input command is stored in the DMA in put command storage block 23a.

Thus, when no DMA transfer is performed, the DMA output block 12a and the DMA input block 13a can reduce the power consumption, which further reduces power consumption of the ATM cell assembling/disassembling apparatus.

Embodiment 3

Figure 5:
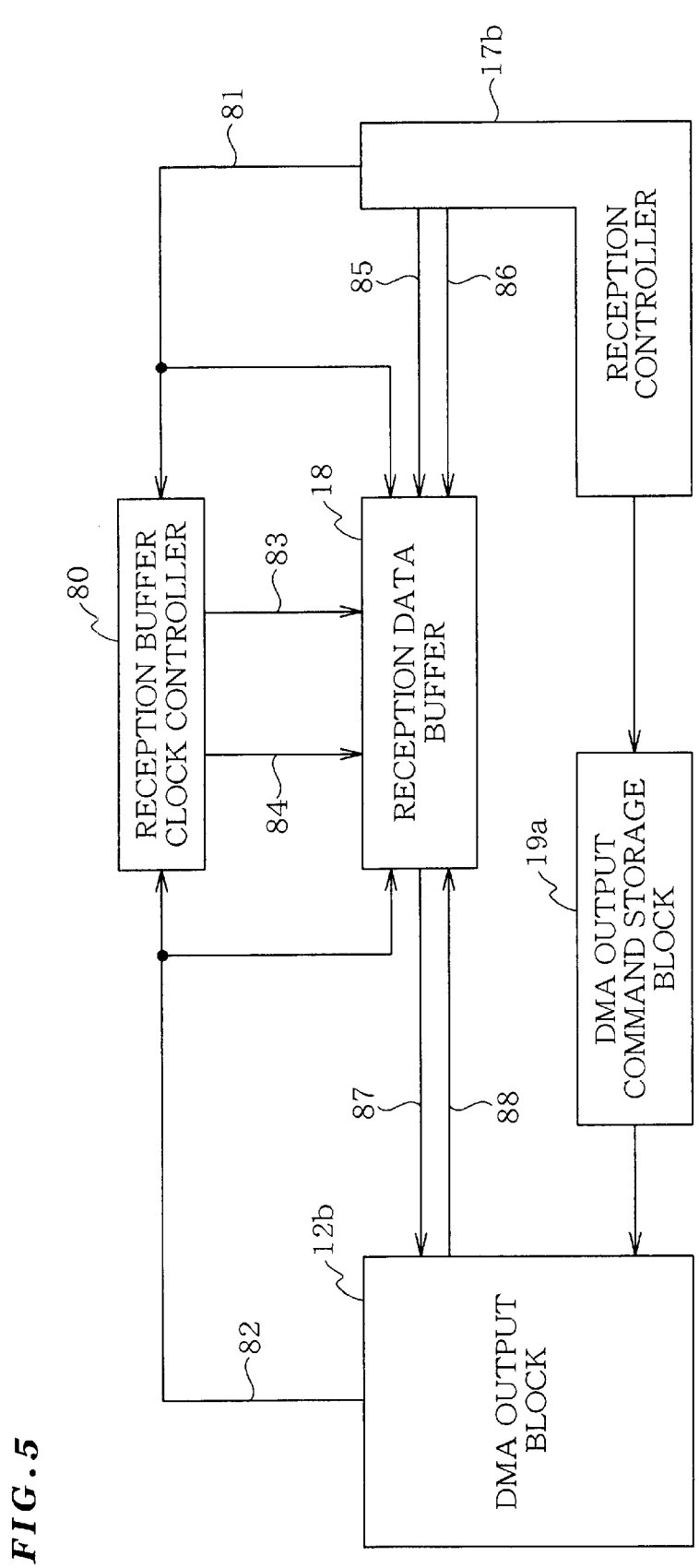
FIG. 5 is a block diagram showing a configuration of an ATM cell assembling/disassembling apparatus according to a third embodiment of the present invention.

FIG. 5 is a block diagram showing configuration of an ATM cell assembling/disassembling apparatus according to a third embodiment. Note that FIG. 5 shows only a portion which is different from FIG. 1 and FIG. 4.

The ATM cell assembling/disassembling apparatus according to the third embodiment is identical to that of the second embodiment except for that power consumption of the reception data buffer is reduced.

That is, in the ATM cell assembling/disassembling apparatus of the second embodiment, clock is supplied to the reception data buffer even while no data write or read is performed to the reception data buffer. In contrast to this, in the ATM cell assembling/disassembling apparatus of the third embodiment, the reception controller 17b outputs a write-in signal indicating that a data is being written into the reception data buffer 18, and the DMA output block 12b outputs a read-out signal indicating that a read out is being performed from the reception data buffer 18. The third embodiment includes reception data storage clock control unit for supplying a write clock to the reception data buffer 18 only when the write-in signal indicates that a data is being written in, and supplying a read clock to the reception data buffer 18 only when the read-out signal indicates that a data is being read out.

The basic configuration of the ATM cell assembling/disassembling apparatus of the third embodiment is identical to that of the second embodiment, but the third embodiment includes a reception buffer clock controller 80.

Hereinafter, explanation will be given on the difference between the ATM cell assembling/disassembling apparatus of the third embodiment and that of the second embodiment.

In the third embodiment, the reception data buffer 18 is constituted by a synchronous type dual port static RAM (hereinafter, referred to as a synchronous type dual port SRAM).

The synchronous dual port SRAM normally has a write-in port and a read-out port which are independent from each other, and write-in operation and read-out operation are performed in synchronization with the write-in clock and the readout clock, respectively.

In general, in the synchronous dual port SRAM, if the write-in signal is "0" at the rise timing of the supplied write-in clock, at that moment, a write-in data is stored in the write-in address which has been input.

Moreover, in the synchronous dual port SRAM, if the read-out signal is "1" at the rise timing of the supplied read-out clock, at that moment, a data stored in the read-out address which has been input is output as a read-out data. Note that there is also a case that no read-out signal is required.

The reception controller 17b operates as follows. In step S54a of FIG. 2, when writing a reception payload data into the reception data buffer 18, the reception controller 17b outputs a write-in address 85 and a write-in data 86 to the write-in port of the reception data buffer 18 and outputs a write-in signal 81 whose value is "0", to the write-in port of the reception data buffer 18 and to the reception buffer clock controller 80. When output of the write-in address 85 and the write-in data 86 is complete, the reception controller 17b makes the write-in signal "1". The other function of the reception controller 17b is identical to the reception controller 17 of the first embodiment.

The DMA output block 12b operates as follows. In step S55a of FIG. 2, when reading out a reception payload data from the reception data buffer 18, the DMA output block 12b outputs a read-out address 87 to the read-out port of the reception data buffer 18, and outputs to the read-out port of the reception data buffer 18 and to the reception buffer clock controller 80, a read-out signal 82 whose value is "1". When the output of the read-out address 87 is complete, the DMA output block 12b makes the read-out signal 82 "0". The other function of the DMA output block 12b is identical to the DMA output block 12a of the second embodiment.

The reception buffer clock controller 80 outputs a write-in clock 83 to the reception data buffer 18 while the write-in signal 81 is "0" and the reception controller 17b is performing write-in to the reception data buffer 18. Here, the reception buffer clock controller 80 starts output of the write-in clock 83 in synchronization with the first clock rise after the write-in signal 81 has become "0" and terminates output of the write-in clock 83 in synchronization with the first clock rise after the write-in signal 81 has become "1".

Moreover, the reception buffer clock controller 80 outputs a read-out clock 84 to the reception data buffer 18 while the read-out signal 82 is "1" and the DMA output block 12b performing read-out from the reception data buffer 18. Here, the reception buffer clock controller 80 starts output of the read-out clock 84 in synchronization with the first clock rise after the read-out signal 82 has become "1" and terminates output of the read-out clock 84 in synchronization with the first clock rise after the read-out signal 82 has become "0".

Figure 6:
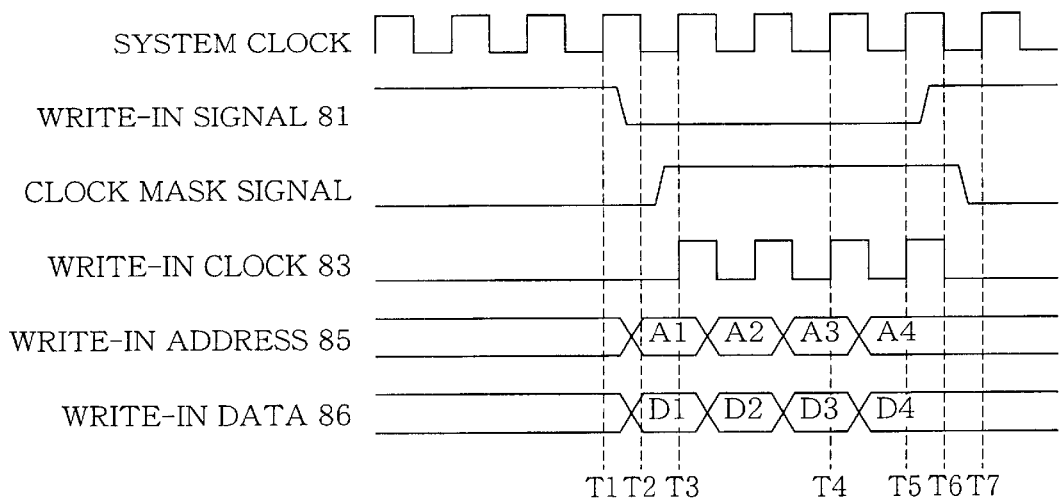
FIG. 6 is a timing chart for explaining a write operation of a reception payload data by the ATM cell assembling/disassembling apparatus of FIG. 5.

FIG. 6 is a timing chart for explaining a reception payload data writing operation by the ATM cell assembling/disassembling apparatus of the third embodiment.

FIG. 6 shows how the reception controller 17b successively write into the reception data buffer 18, a data of four words from the reception payload data.

For convenience of explanation, a clock supplied from outside to the ATM cell assembling/disassembling apparatus and distributed to the respective blocks will be referred to as a system clock.

The clock supplied to the reception controller 17b and to the DMA output block 12b is the system clock which is supplied for a predetermined period of time. The clock supplied to the reception controller 17b and to the DMA output block 12b is in the same timing as the system clock and accordingly, the clock will be referred to as a system clock in the explanation below.

The reception controller 17b outputs a write-in address 85 (A1 in FIG. 6) and a write-in data 86 (D1 in FIG. 6) for the first word in synchronization with the system clock rise at time T1 and makes the write-in signal "0".

When the write-in signal has become "0", the reception buffer clock controller 80 starts supply of a write-in clock 83 to the reception data buffer 18 in synchronization with the next system clock rise, i.e., clock rise at time T3.

In order to realize such a function, the reception buffer clock controller 80 latches the write-in signal 81 output from the reception controller 17b, in synchronization with the system clock falling edge and creates a clock mask signal by inverting the latched signal. AND of the clock mask signal and the system clock is made as the write-in clock 83.

After this, the reception controller 17b successively outputs, for every one clock from T3, the write address 85 (A2 and A3 in FIG. 6) and write-in data 86 (D2 and D3 in FIG. 6) for the second and third words, and outputs the write-in address 85 (A4 in FIG. 6) and the write-in data 86 (D4 in FIG. 6) for the fourth word in synchronization with the clock rise at time T4.

The write-in data 86 for the fourth word is written into the reception data buffer 18 at time T5. Here, the write-in of the four words is complete, and the reception controller 17b returns the write-in signal 81 to "1".

When the write-in signal 81 has become "1", the reception buffer clock controller 80 terminates supply of the write-in clock 83 to the reception data buffer 18, in synchronization with the next system clock rise, i.e., at clock rise of time T7.

It should be noted that after time T5, the write-in address and the write-in data may have any value and the reception controller 17b retains output of the write-in address 85 and the write-in data 86 of the fourth word until next write-in is performed.

Figure 7:
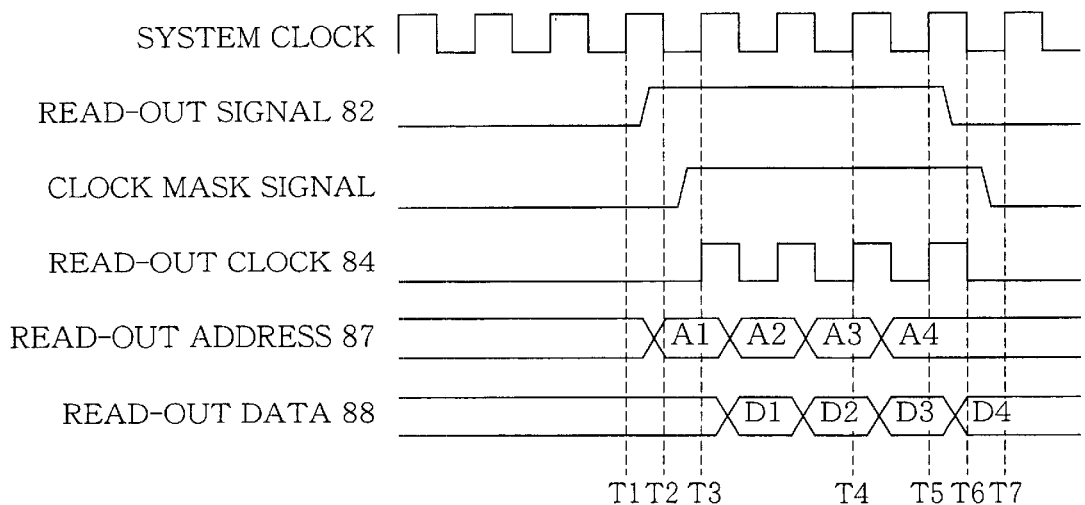
FIG. 7 is a timing chart for explaining a read operation of a reception payload data by the ATM cell assembling/disassembling apparatus of FIG. 5.

FIG. 7 is a timing chart for explaining a read-out operation of a reception payload data by the ATM cell assembling/disassembling apparatus.

FIG. 7 shows how the DMA output block 12b successively reads out from the reception data buffer 18, a data of four words from the reception payload data.

In synchronization with the system clock rise at time T1 in FIG. 7, the DMA output block 12b outputs a read-out address 87 (A1 in FIG. 7) corresponding to the first word and makes the read-out signal 82 "1".

When the read-out signal 82 has become "1", the reception buffer clock controller 80 starts supply of the read-out clock 84 to the reception data buffer 18, in synchronization with the next system clock rise, i.e., at clock rise of time T3.

In order to realize such a function, the reception buffer clock controller 80 internally generates a clock mask signal by latching the read-out signal 82 output from the DMA output block 12b, in synchronization with the system clock falling edge, and makes AND of this clock mask signal and the system clock as the read-out clock 84.

After this, the DMA output block 12*b* successively outputs, for every one clock from time T3, the read-out address (A2 and A3 in FIG. 7) corresponding to the second and the third word outputs the read-out address (A4 in FIG. 7) for the fourth word in synchronization with the clock rise at time T4.

The read-out address 87 for the fourth word is interpreted by the reception data buffer 18 at time T5. The read-out data 88 (D4 in FIG. 7) which becomes the fourth word is output from the reception data buffer 18 in synchronization with the read-out clock rise at time T5. At this moment, data read-out of four words is complete, and the DMA output block 12*b* resets the read-out signal 82 to "0".

When the read-out signal 81 has become "0" the reception buffer clock controller 80 terminates supply of the read-out clock 84 to the reception data buffer 18, in synchronization with the next system clock rise, i.e., at the clock rise at time T7.

It should be noted that after time T5, the read-out address may have any value and the DMA output block 12*b* retains the output of the read-out address 87 of the fourth word until next read-out is performed.

As has been described above, the third embodiment includes: the reception controller 17*b* for outputting to the reception data buffer 18, the write-in signal 81 which becomes "0" when starting output of the write-in address 85 and the write-in data 86 and becomes "1" when the output of the write-in address 85 and the write-in data 86 is complete; the DMA output block 12*b* for outputting to the reception data buffer 18, the read-out signal 82 which becomes "1" when starting output of the read-out address 87 and becomes "0" when the output of the read-out address 87 is complete; and the reception buffer clock controller 80 which starts output of the write-in clock 83 at the first clock rise after the write-in signal 81 has become "0" and terminates output of the write-in clock 83 at the first clock rise after the write-in signal 81 has become "1"; and which starts output of the read-out clock 84 at the first clock rise after the read-out signal 82 has become "1" and terminates output of the read-out clock 84 at the first clock rise after the read-out signal 82 has become "0". Thus, the reception data buffer 18 is supplied with the write-in clock 83 only when write-in is performed, and with the read-out 84 clock only when read-out is performed.

For explaining the third embodiment more specifically, the reception total bit rate of the ATM cell assembling/disassembling apparatus is assumed to be 156 Mbps. In this third embodiment, when a cell of valid reception VC is received at the reception rate of 26 Mbps, a reception payload data is written in and read out to/from the reception data buffer 18 only during the period of time: 26÷156×100= 17%.

Moreover, if the system clock is 19.5 MHz, reception payload data write-in for one cell is performed at 53 clock interval in average. If the clock is supplied all the time, 53 clocks are required for writing in the one cell reception payload data.

In contrast to this, by using a synchronous type SRAM of 32-bit width for the reception data buffer 18, in order to write in a 48-byte payload data into the reception data buffer 18, only a data of 12 words should be written in. In this case, in the present embodiment, only 12 clocks of the write-in clock 83 are supplied.

Accordingly, in contrast to the second embodiment in which clock is supplied to the reception data buffer 18 all the time, in this third embodiment, the write-in clock 83 is supplied to the reception data buffer 18 only during a period of time: (26÷156)×(12÷53)×100=4%. No write-in clock is supplied for the remaining 96% period of time.

The situation is the same in the reception payload data read-out. The read-out clock 84 is supplied only during 4% period of time, and no read-out clock is supplied for the remaining 96% period of time.

Accordingly, in this third embodiment, in contrast to the second embodiment, it is possible to further reduce the power consumption of 96% in the reception data buffer 18.

As has been described above, in this third embodiment, the clock supply to the reception data buffer 18 is stopped while no data is written in or read out to/from the reception data buffer 18. Thus, the power consumption in the reception data buffer 18 is significantly reduced, which further reduces the power consumption of the ATM cell assembling/disassembling apparatus.

Embodiment 4

Figure 8:
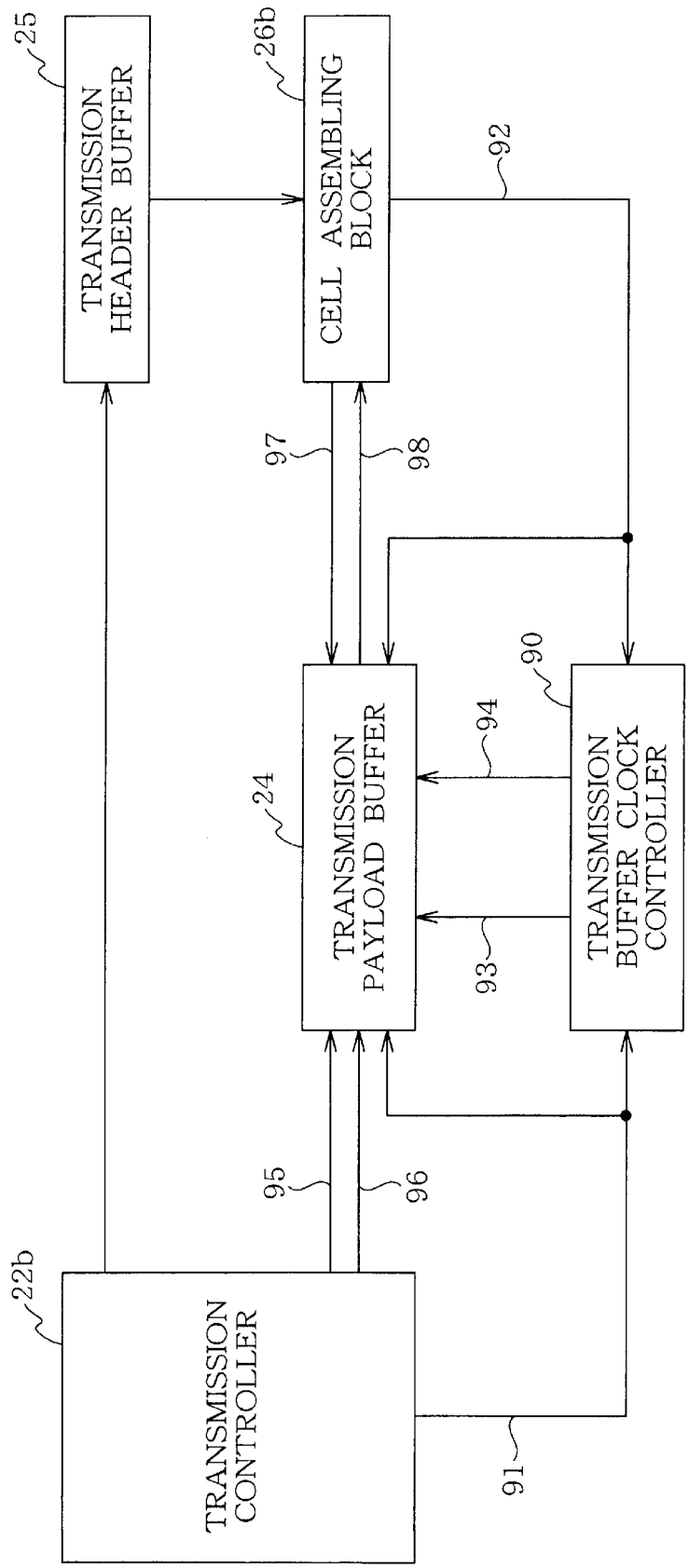
FIG. 8 is a block diagram showing a configuration of an ATM cell assembling/disassembling apparatus according to a fourth embodiment of the present invention.

FIG. 8 is a block diagram showing a configuration of an ATM cell assembling/disassembling apparatus according to a fourth embodiment. Note that FIG. 8 shows only a portion which is different from FIG. 1, FIG. 4, and FIG. 5.

The ATM cell assembling/disassembling apparatus according to the fourth embodiment is identical to that of the third embodiment except for that the power consumption of the transmission payload buffer is reduced.

That is, in the ATM cell assembling/disassembling apparatus of the third embodiment, clock is supplied to the transmission payload buffer 24 even when no write-in or read-out is performed to/from the transmission payload buffer 24. In contrast to this, in the ATM cell assembling/disassembling apparatus of the fourth embodiment, the transmission controller 22*b* outputs a write-in signal indicating that a data is being written to the transmission payload buffer 24, and the cell assembling block 26*b* outputs a read-out signal indicating a data is being read out from the transmission payload buffer 24. The payload buffer 24 is supplied with a write-in clock only when the write-in signal indicates that a data is being written in, and with a read-out clock only when the read-out signal indicates that a data is being read out. This is realized by transmission payload data storage clock control unit.

The ATM cell assembling/disassembling apparatus of the fourth embodiment has a basic configuration identical to that of the third embodiment except for that the fourth embodiment includes a transmission buffer clock controller 90.

Hereinafter, explanation will be given on the difference between the ATM cell assembling/disassembling apparatus of the fourth embodiment and the ATM cell assembling/disassembling apparatus of the third embodiment.

In this fourth embodiment, the transmission payload buffer 24 employs a synchronous type dual port SRAM.

In the processing of step S65*a* of FIG. 3, when the transmission controller 22*b* stores a payload data in the transmission payload buffer 24, the transmission controller 22*b* outputs a write-in address 95 and a write-in data 96 to the write-in port of the transmission payload buffer 24 and outputs a write-in signal 91 whose value "0", to the write-in port of the transmission payload buffer 24 and to the transmission buffer clock controller 90. When the output of the write-in address 95 and the write-in data 96 is complete, the transmission controller 22*b* makes the write-in signal 91 "1". The other operation of the transmission controller 22*b* is identical to the transmission controller 22 of the first embodiment.

In the processing of step S66a of FIG. 3, when the cell assembling block 26b reads out a transmission payload data from the transmission payload buffer 24, the cell assembling block 26b outputs a read-out address 97 to the read-out port of the transmission payload buffer 24, and outputs a read-out signal 92 whose value is "1" to the read-out port of the transmission payload buffer 24 and to the transmission buffer clock controller 90. Upon completion of output of the read-out address 97, the cell assembling block 26b makes the read-out signal 92 "0". The other operation of the cell assembling block 26b is identical to the cell assembling block 26 of the first embodiment.

The transmission buffer clock controller 90 outputs a write-in clock 93 to the transmission payload buffer 24 while the write-in signal 91 is "0" and the transmission controller 22b is performing write-in to the transmission payload buffer 24. Here, the transmission buffer clock controller 90 starts output of the write-in clock 93 in synchronization with the first clock rise after the write-in signal 91 has become "0" and terminates output of the write-in clock 93 in synchronization with the first clock rise after the write-in signal 91 has become "1".

Moreover, the transmission buffer clock controller 90 outputs a read-out clock 94 to the transmission payload buffer 24 while the read-out signal 92 is "1" and the cell assembling block 26 is performing read-out from the transmission payload buffer 24. Here, the transmission buffer clock controller 90 starts output of the read-out clock 94 in synchronization with the first clock rise after the read-out signal 92 has become "1" and terminates output of the read-out clock 94 in synchronization with the first clock rise after the read-out signal 92 has become "0".

The payload data write-in operation to the transmission payload buffer 24 by the transmission controller 22b and the payload data read-out operation from the transmission payload buffer 24 by the cell assembling block 26b are write-in and read-out to/from the synchronous type SRAM which are identical to the reception payload data write-in operation to the reception data buffer 18 by the reception controller 17b and the reception payload data read-out from the reception data buffer 18 by the DMA output block 12b which have been explained in the third embodiment.

Moreover, the output timings of the write-in signal 91 and the read-out signal 92 are identical to the output timings of the write-in signal 81 and the read-out signal 82 which have been explained in the third embodiment.

Accordingly, supply of the write-in clock 93 and the read-out clock 94 to the transmission payload buffer 24 by the transmission buffer clock controller 90 can easily be known from the supply of the writ-in clock 83 and the read-out clock 84 to the reception data buffer 18 in the third embodiment. In the fourth embodiment, detailed explanation about those clocks are omitted.

The configuration feature of the fourth embodiment is as follows. The ATM cell assembling/disassembling apparatus according to the fourth embodiment includes: the transmission controller 22b for transmitting the write-in signal 91 which becomes "0" upon start of output of a write-in address 95 and a write-in data 96 to the transmission payload buffer 24 and becomes "1" upon completion of the output of the write-in address 95 and the write-in data 96; the cell assembling block 26b for transmitting the read-out signal 92 which becomes "1" upon start of output of a read-out address 97 to the transmission payload buffer 24 and becomes "0" upon completion of the output of the read-out address; and the transmission buffer clock controller 90 which starts output of the write-in clock 93 at the first clock rise after the write-in signal 91 has become "0" and terminates output of the write-in clock 93 at the first clock rise after the write-in signal 91 has become "1", and starts output of the read-out clock 94 at the first clock rise after the read-out signal 92 has become "1" and terminates output of the read-out clock 94 at the first clock rise after the read-out signal 92 has become "0".

Thus, it is possible to supply the write-in clock 93 only when write-in is performed to the transmission payload buffer 24, and to supply the read-out clock only when read-out is performed.

For explaining the apparatus more specifically, it is assumed that the ATM cell assembling/disassembling apparatus has a transmission total bit rate of 156 Mbps. When a cell of valid VC is transmitted at the transmission rate of 26 Mbps, payload data write-in and read-out to/from the transmission payload buffer 24 is performed only during a period of time: 26÷156×100=17%.

This is because a payload data of a pseudo cell used for transmission rate adjustment is created in the cell assembling block 26 and not written into the transmission payload buffer 24. That is, only the payload data used for a cell assembling of valid transmission cell is written into the transmission payload buffer 24.

Moreover, when the system clock is 19.5 MHz, transmission payload data write-in for one cell is performed at 53-clock interval in average. If the clock is supplied all the time, 53 clocks are required for writing in the one cell transmission payload data.

In contrast to this, if a synchronous type SRAM of 32-bit width is employed for the transmission payload buffer 24, a 48-byte payload data can be written into the transmission payload buffer 24 only by writing a 12-word data. In this case, in the fourth embodiment, the write-in clock 93 is supplied only for 12 clocks.

Accordingly, in contrast to the third embodiment in which clock is supplied to the transmission payload buffer 24 all the time, the fourth embodiment supplies the write-in clock to the transmission payload buffer 24 only during a period of time: (26÷156)×(12÷53)×100=4%. The write-in clock 93 is not supplied for the remaining 96% period of time.

The same applies for the transmission payload data read-out. The read-out clock 94 is supplied only during 4% period of time and no read-out clock 94 is supplied for the remaining 96% period of time.

Accordingly, in this fourth embodiment, it is possible to further reduce the power consumption by 96% in the transmission payload buffer 24 in comparison to the third embodiment.

As has been described above, in this fourth embodiment, no clock is supplied to the transmission payload buffer 24 while no data write-in or read-out is performed to/from the transmission payload buffer 24. Thus, it is possible to reduce the power consumption in the transmission payload buffer and further reduce the power consumption of the ATM cell assembling/disassembling apparatus.

According to the present invention, there is provided reception clock control unit which starts clock supply to the reception control unit when the reception VC detection unit has decided that a reception cell is valid, and terminates clock supply to the reception control unit upon completion of the processing for one cell by the reception control unit. This reduces power consumption of the reception control unit and accordingly, reduces the power consumption of the ATM cell assembling/disassembling apparatus.

Moreover, there is provided the transmission clock control unit which starts clock supply to the transmission control unit when the transmission scheduling unit has decided to transmit a cell of valid VC, and terminates the clock supply to the transmission control unit upon completion of the processing for one cell in the transmission control unit. This reduces power consumption of the transmission control unit and accordingly, further reduces the power consumption of the entire ATM cell assembling/disassembling apparatus.

Moreover, there is provided the DMA output clock control unit which enables to reduce the power consumption in the DMA output unit and accordingly, to further reduce the power consumption of the entire ATM cell assembling/disassembling apparatus.

Moreover, there is provided the DMA input clock control unit which enables to reduce the power consumption in the DMA input unit and accordingly, to further reduce the power consumption of the entire ATM cell assembling/disassembling apparatus.

Moreover, there is provided the reception data storage clock control unit which reduces power consumption of the reception data storage unit and accordingly, further reduces power consumption of the entire ATM cell assembling/disassembling apparatus.

Moreover, there is provided the transmission payload storage clock control unit which enables to reduce power consumption of the transmission payload storage unit and accordingly, to further reduce power consumption of the entire ATM cell assembling/disassembling apparatus.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-032573 (Filed on Feb. $10^{th}$, 1999) including specification, claims, drawings and summary are incorporated herein by reference in its entirety.

What is claimed is:

1. An ATM cell assembling/disassembling apparatus arranged on an ATM terminal of an ATM network and connected to a physical layer device, a host CPU, and a host memory, said apparatus comprising:

cell reception unit for receiving a cell from the physical layer device;

reception VC detection unit for deciding whether the reception cell is valid according to a VPI/VCI information in a header of the reception cell;

reception control unit for performing DMA transfer request after disassembling and error checking the cell which has been decided to be valid by the reception VC detection unit;

reception data storage unit for temporarily storing a reception payload data extracted from the reception cell by the reception control unit;

DMA output unit for reading out a reception payload data from the reception data storage unit according to a DMA transfer request from the reception control unit and DMA-transferring the reception payload data to the host memory; and reception clock control unit which starts clock supply to the reception control unit when the reception cell is decided to be valid by the reception VC detection unit, and terminates the clock supply to the reception control unit upon completion of processing for one cell by the reception control unit after the reception control unit performs cell disassembling and error check, stores a reception payload data in the reception data storage unit, and sends a request of a DMA transfer to the DMA output unit.

2. An ATM assembling/disassembling apparatus arranged on an ATM terminal of an ATM network and connected to a physical layer device, a host CPU, and a host memory, said apparatus comprising:

transmission scheduling unit for deciding a VC for the next cell to be transmitted;

transmission control unit for performing DMA transfer request for requesting the transmission payload data of the VC if the VC is decided to be a valid transmission VC, and according to the data fetched by the DMA transfer, creating a transmission payload data and a cell header;

payload storage unit for temporarily storing the transmission payload data which has been created by the transmission control unit;

transmission header storage unit for temporarily storing the cell header which has been created by the transmission control unit;

cell assembling unit for combining the cell header stored in the transmission header storage unit and the transmission payload data stored in the transmission payload storage unit, so as to create a cell;

cell transmission unit for transmitting the transmission cell prepared by the cell assembling unit, to the physical layer device;

DMA input unit for reading out the transmission payload data from the host memory according to the DMA transfer request from the transmission control unit, and DMA-transferring the transmission payload data to the transmission control unit; and transmission clock control unit which starts clock supply to the transmission control unit when the transmission scheduling unit has decided to transmit a cell of the valid transmission VC and terminates the clock supply to the transmission control unit after the transmission control unit stores the cell header and the transmission payload data in the transmission header storage unit and the transmission payload storage unit, respectively, thus completing processing for one cell in the transmission control unit.

3. The ATM cell assembling/disassembling apparatus as claimed in claim 1, said apparatus further comprising:

DMA output command storage unit for storing the DMA transfer request issued as a command from the reception control unit; and DMA output clock control unit which starts clock supply to the DMA output unit when the number of commands stored in the DMA output command storage unit has become one or more and terminates the clock supply to the DMA output unit if the number of commands stored in the DMA output command storage unit is 0 when DMA transfer of one command is completed by the DMA output unit, wherein the DMA output unit operates according to the clock, reads out a command from the DMA output command storage unit and performs DMA transfer according to the command which has been read out.

4. The ATM cell assembling/disassembling apparatus as claimed in claim 2, said apparatus further comprising:

DMA input command storage unit for storing the DMA transfer request issued as a command from the transmission control unit; and DMA input clock control unit which starts clock supply to the DMA input unit when the number of commands stored in the DMA input command storage unit has become one or more and terminates the clock supply to the DMA input unit if the number of commands stored in the DMA input command storage unit is 0 when DMA transfer of one command is completed by the DMA input unit, wherein the DMA input unit operates according to the clock, reads out a command from the DMA input command storage unit and performs DMA transfer according to the command which has been read out.

5. The ATM cell assembling/disassembling apparatus as claimed in claim 3, wherein the reception control unit outputs a write-in signal indicating that a reception payload data is being written into the reception data storage unit; and the DMA output unit outputs a read-out signal indicating that a reception payload data is being read out from the reception data storage unit;

said ATM cell assembling/disassembling apparatus further comprising reception data storage clock control unit which, referencing the write-in signal and the read-out signal, supplies a write-in clock to the reception data storage unit only if the write-in signal indicates that a data is being written in and supplies a read-out clock to the reception data storage unit only if the read-out signal indicates that a data is being read out.

6. The ATM cell assembling/disassembling apparatus as claimed in claim 4, wherein the transmission control unit outputs a write-in signal indicating that a transmission payload data is being written into the transmission payload storage unit; and the cell assembling unit outputs a read-out signal indicating that a transmission payload data is being read out from the transmission payload storage unit;

said ATM cell assembling/disassembling apparatus further comprising transmission payload storage clock control unit which references the write-in signal and the read-out signal and supplies a write-in clock to the transmission payload storage unit only if the write-in signal indicates that a data is being written in, and supplies a read-out clock to the transmission payload storage unit only if the read-out signal indicates that a data is being read out.

* * * * *